Patented Apr. 19, 1932　　　　　　　　　　　　　　　　1,854,765

UNITED STATES PATENT OFFICE

FRITZ ROTHE AND HANS BRENEK, OF BERLIN, GERMANY, ASSIGNORS TO THE FIRM: RHENANIA-KUNHEIM VEREIN CHEMISCHER FABRIKEN AKTIENGESELLSCHAFT, BERLIN, GERMANY

PROCESS FOR OBTAINING ALUMINA AND PHOSPHATES

No Drawing. Application filed July 22, 1927, Serial No. 207,811, and in Germany June 4, 1925.

We have filed applications in Germany, June 4, 1925; in Great Britain, June 24, 1927.

The invention has reference to a process for obtaining alumina and phosphates which may be used as fertilizers from aluminium phosphate.

The process according to the invention consists in mixing alumina phosphates, which may be natural products or artificially produced with alkaline earth metal compounds and alkali metal compounds and subjecting said mixture to a heating. By the reaction which is effected at this heating operation on the one hand the alumina is bound to alkali under formation of alkali aluminate, whereas on the other hand the phosphoric acid is bound to the lime.

The alkaline earth metal and the alkali metal may be used either in the form of their very oxides or in the form of such compounds which form oxides when heated, as for instance their carbonates or other salts.

The most favourable result will be obtained if the proportions in the crude mixture containing alumina phosphate, alkaline earth metal compounds and alkali metal compounds are chosen in such a manner, that there are present for every molecule of $P_2O_5$ 2 molecules of alkaline earth metal oxide and 1 molecule of alkali metal oxide and for 1 molecule of $Al_2O_3$ an additional molecule of alkali metal oxide. In this manner alkali dicalciumphosphate is obtained, if calcium oxide is used as alkaline earth compound. In cases where the material to be treated contains silica, there must be added such a further quantity of alkaline earth metal oxide, that alkaline earth metal orthosilicate ($2RO.SiO_2$) can be formed.

On carrying out the process according to the invention the heating product which may be previously have been split into pieces, is extracted with water, and the alumina is obtained in a known manner from the aluminate lye obtained after being dried and milled. The residue of lixiviation which contains the total phosphoric acid, represents a fertilizer of excellent qualities, since the phosphoric acid contained therein is easily to be taken up by plant.

An example showing how the invention is carried into practice is as follows:—

100 parts of South African alumina phosphate having the following composition, 22.8% $H_2O$
34.7% $P_2O_5$
32.4% $Al_2O_3$
4.8% $Fe_2O_3$
2.5% $SiO_2$
3.2% $CaO$ were powdered and mixed with 49 parts of $CaCO_3$, corresponding to 2 mols of $CaO$ calculated for $P_2O_5$, 27 parts of $Na_2CO_3$, corresponding to 1 mol of $Na_2O$ calculated for $P_2O_5$, and also 34 parts of $Na_2CO_3$, corresponding to 1 mol of $Na_2O$ calculated for $Al_2O_3$, and 2.6 parts of $CaCO_3$, as to insure the union of the silica as orthosilicate. This mixture was heated. From the ignition product which contained 23.05 parts of $Al_2O_3$, 22.6 parts were brought into solution in the form of sodium aluminate by treatment with water. This represented a yield of about 98%. The phosphoric acid in the residue after the water treatment was citrate-soluble up to 97%.

What we claim and desire to secure by Letters Patent of the United States is:

A process for making valuable aluminum compounds and fertilizing phosphates, which consists in converting aluminum phosphate into alkali metal aluminate and alkali metal di-alkali earth metal phosphate, by calcining mixtures of aluminum phosphate with such amounts of alkali metal compounds and alkali earth metal compounds as to provide in the mixture two molecules of alkali earth metal oxide and one molecule of alkali metal oxide for each molecule of phosphorous pentoxide present in said mixture and to simultaneously provide one additional molecule of alkali metal oxide for each molecule of aluminum oxide present, and then leaching the product thus obtained with water.

FRITZ ROTHE.
HANS BRENEK.